(12) United States Patent
Feng et al.

(10) Patent No.: US 11,226,686 B2
(45) Date of Patent: Jan. 18, 2022

(54) INTERACTIVE USER GESTURE INPUTS

(71) Applicant: Lenovo (Singapore) Pte. Ltd., Singapore (SG)

(72) Inventors: Xin Feng, Arcadia, CA (US); Robert James Kapinos, Durham, NC (US); Jon Wayne Heim, Durham, NC (US); Paul Hilburger, Cary, NC (US); James Anthony Hunt, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 832 days.

(21) Appl. No.: 14/159,089

(22) Filed: Jan. 20, 2014

(65) Prior Publication Data

US 2015/0205359 A1 Jul. 23, 2015

(51) Int. Cl.
*G06F 3/01* (2006.01)
(52) U.S. Cl.
CPC .................................... *G06F 3/017* (2013.01)
(58) Field of Classification Search
CPC ....................................................... G06F 3/017
See application file for complete search history.

(56) References Cited

U.S. PATENT DOCUMENTS

| | | | |
|---|---|---|---|
| 5,963,191 A * | 10/1999 | Jaaskelainen, Jr. | ... G06F 3/0481 715/856 |
| 6,867,790 B1 * | 3/2005 | Brooks | ............... G06F 3/04812 345/157 |
| 9,288,471 B1 * | 3/2016 | Yang | ..................... G01B 11/245 |
| 2004/0070612 A1 * | 4/2004 | Sinclair | ................... G06F 9/451 715/762 |
| 2005/0108642 A1 * | 5/2005 | Sinclair, II | .......... G06F 9/44505 715/700 |
| 2006/0053387 A1 * | 3/2006 | Ording | .................. G06F 3/0236 715/773 |
| 2006/0139312 A1 * | 6/2006 | Sinclair, II | ............ G06F 3/0481 345/156 |
| 2008/0030463 A1 * | 2/2008 | Forest | ....................... A61F 4/00 345/156 |
| 2008/0168364 A1 * | 7/2008 | Miller | ..................... G06F 3/016 715/762 |

(Continued)

FOREIGN PATENT DOCUMENTS

| CN | 102413886 A | 4/2012 |
|---|---|---|
| CN | 103338289 A | 10/2013 |

(Continued)

*Primary Examiner* — Ryan Barrett
(74) *Attorney, Agent, or Firm* — Ference & Associates LLC

(57) ABSTRACT

An aspect provides a method, including: capturing, using a gesture input component of an information handling device, a user gesture input; processing, using a processor, the captured user gesture input to extract one or more features; comparing, using a processor, the one or more extracted features of the user gesture input to a predetermined gesture input; determining, using a processor, that a confidence level calculated based on the comparing exceeds a lower similarity threshold but does not exceed a higher similarity threshold; and performing an action selected from the group consisting of communicating with the user, and adjusting the gesture input component. Other aspects are described and claimed.

15 Claims, 7 Drawing Sheets

(56) References Cited

U.S. PATENT DOCUMENTS

| | | | |
|---|---|---|---|
| 2010/0207874 A1* | 8/2010 | Yuxin | G06F 3/017 |
| | | | 345/156 |
| 2010/0281432 A1 | 11/2010 | Geisner et al. | |
| 2010/0295781 A1* | 11/2010 | Alameh | G06F 3/017 |
| | | | 345/158 |
| 2011/0273380 A1 | 11/2011 | Martin | |
| 2011/0320949 A1 | 12/2011 | Ohki et al. | |
| 2012/0200494 A1* | 8/2012 | Perski | G06F 3/017 |
| | | | 345/156 |
| 2014/0149754 A1* | 5/2014 | Silva | G06F 1/3212 |
| | | | 713/300 |
| 2014/0191972 A1* | 7/2014 | Case | G06F 3/017 |
| | | | 345/168 |
| 2014/0267004 A1* | 9/2014 | Brickner | G06F 3/017 |
| | | | 345/156 |
| 2015/0193124 A1* | 7/2015 | Schwesinger | G06F 3/017 |
| | | | 715/863 |
| 2015/0199019 A1* | 7/2015 | Steers | G06F 3/017 |
| | | | 348/148 |
| 2016/0187992 A1* | 6/2016 | Yamamoto | G06K 9/00389 |
| | | | 345/156 |

FOREIGN PATENT DOCUMENTS

| | | |
|---|---|---|
| GN | 102298442 A | 12/2011 |
| GN | 102759953 A | 10/2012 |
| GN | 103207668 A | 7/2013 |

* cited by examiner

INTERACTIVE USER GESTURE INPUTS

BACKGROUND

Information handling devices ("devices") come in a variety of forms, for example laptop computing devices, tablet computing devices, smart phones, and the like. Increasingly gestures, e.g., user gestures provided to a camera or other optical sensor of a device, are utilized for providing user inputs.

Currently, the algorithms used to detect gestures and take action are straight-forward: a gesture is either recognized or not, and a corresponding predetermined action is performed if the gesture is recognized. This is an all-or-nothing approach. As a result, when a gesture is recognized, the gesture software will carry out a predetermined action or outcome for user. When a gesture is not recognized, however, the system will not perform any action.

BRIEF SUMMARY

In summary, one aspect provides a method, comprising: capturing, using a gesture input component of an information handling device, a user gesture input; processing, using a processor, the captured user gesture input to extract one or more features; comparing, using a processor, the one or more extracted features of the user gesture input to a predetermined gesture input; determining, using a processor, that a confidence level calculated based on the comparing exceeds a lower similarity threshold but does not exceed a higher similarity threshold; and performing an action selected from the group consisting of communicating with the user, and adjusting the gesture input component.

Another aspect provides an information handling device, comprising: a gesture input component; a processor operatively coupled to the gesture input component; a memory device that stores instructions accessible to the processor, the instructions being executable by the processor to: capture, using the gesture input component of an information handling device, a user gesture input; process the captured user gesture input to extract one or more features; compare the one or more extracted features of the user gesture input to a predetermined gesture input; determine that a confidence level calculated based on the comparing exceeds a lower similarity threshold but does not exceed a higher similarity threshold; and perform an action selected from the group consisting of communicating with the user, and adjusting the gesture input component.

A further aspect provides a product, comprising: a storage device having processor executable code stored therewith, the code comprising: code that captures, using a gesture input component of an information handling device, a user gesture input; code that processes, using a processor, the captured user gesture input to extract one or more features; code that compares, using a processor, the one or more extracted features of the user gesture input to a predetermined gesture input; code that determines, using a processor, that a confidence level calculated based on the comparing exceeds a lower similarity threshold but does not exceed a higher similarity threshold; and code that performs an action selected from the group consisting of communicating with the user, and adjusting the gesture input component.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
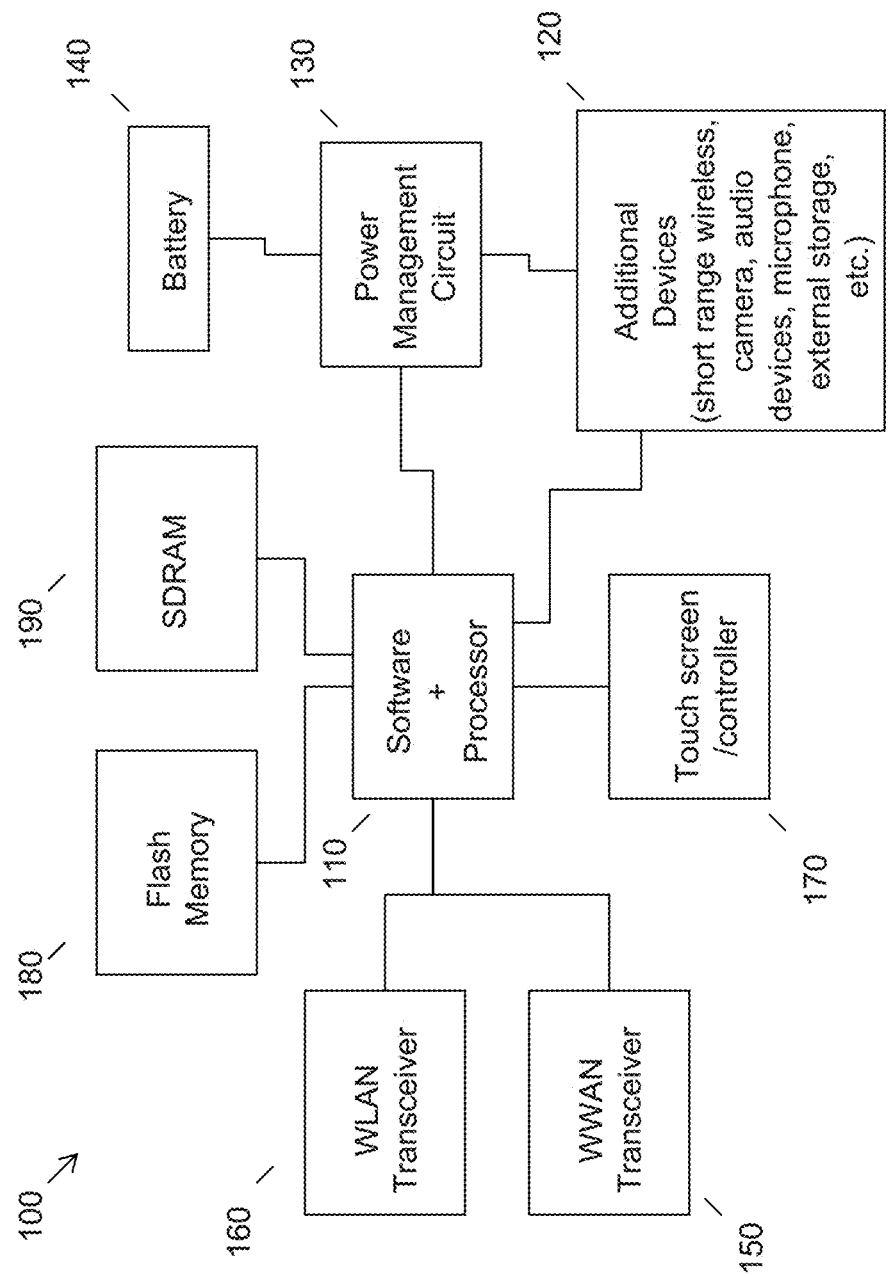
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, conventional systems employ an all-or-nothing approach to gesture recognition. That is, when a gesture is not recognized, the user will not receive any feedback from system. A drawback of this approach is that the gesture system becomes rigid and less interactive/instructive. There is thus a need for a "fuzzy zone" of gesture recognition to resolve such issues, e.g., when a user gesture input is recognized, but with lower confidence. For example, if a person hears something from another person but is not sure if he catches it correctly, he will follow up and confirm: "do you mean . . . " or "say again?"

Accordingly, an embodiment provides for accepting lower confidence level user gesture inputs. In an embodiment, a gesture recognition engine employs more than one threshold, e.g., a higher and a lower threshold, for evaluating a confidence level assigned to the user gesture input. An embodiment thus determines the confidence level of user gesture inputs and compares the same to more than one threshold in order to differentially handle the user gesture inputs according to the level of confidence assigned by the gesture recognition engine. This may include, by way of non-limiting examples, communicating with the user, e.g., to instruct the user as to how to properly perform a gesture, to request that the user provide additional or repeated gesture input, and/or this may include adjusting the gesture input component, e.g., changing a field of view for a camera used to capture image inputs. This provides a more interactive experience in which the user will not become frustrated by a gesture system's lack of responsiveness simply because a single recognition threshold has not been exceeded.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
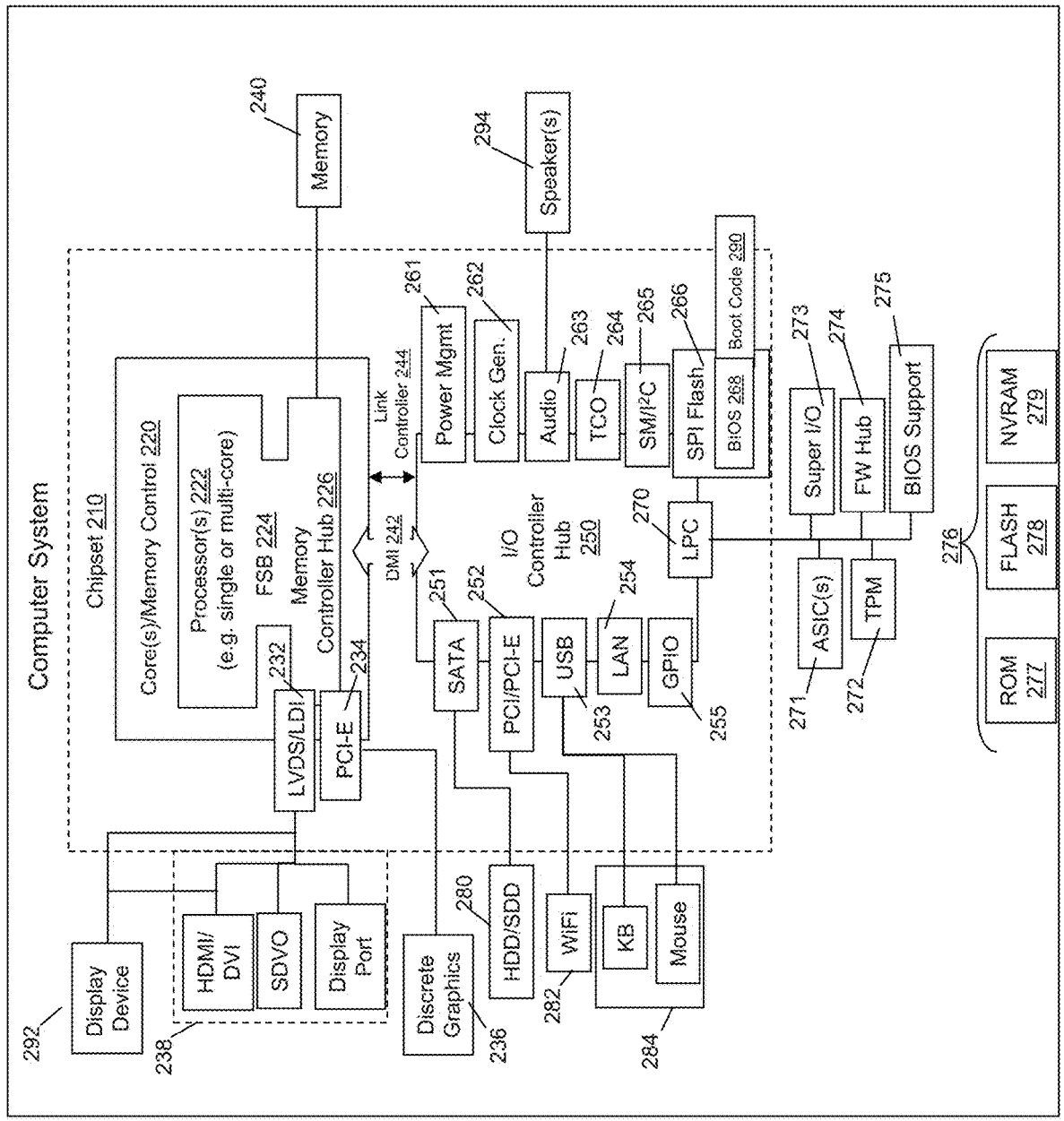
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as laptop computers, desktop computer, tablet computers, etc., that accept gesture inputs. An embodiment therefore may be implemented using device circuitry and components such as outlined in FIG. 1 and FIG. 2 in order to capture, process and handle various gesture user inputs.

Figure 3:
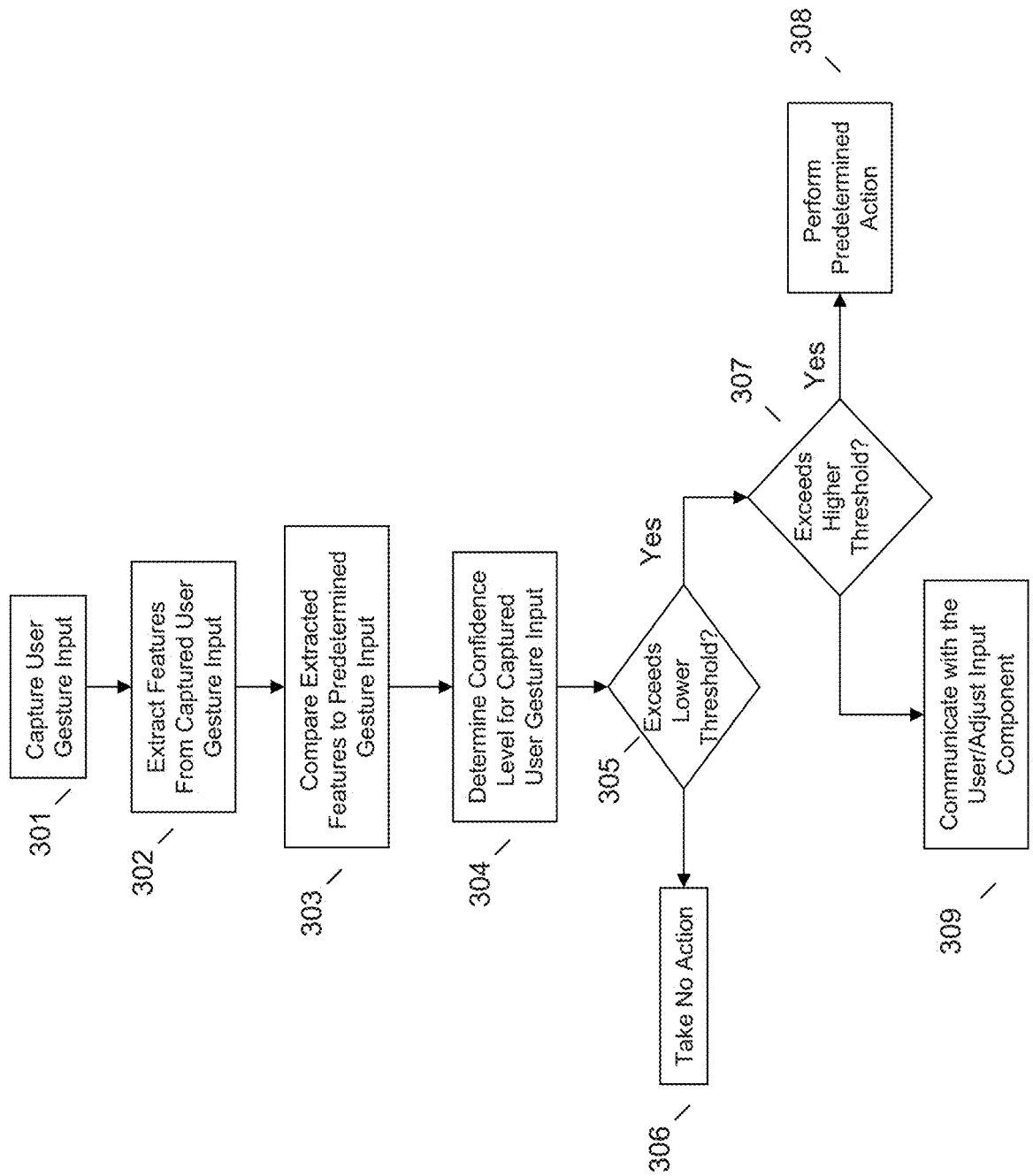
FIG. 3 illustrates an example of a user gesture input.

Referring to FIG. 3, an embodiment captures user gesture inputs provided by a user at 301, e.g., using a camera to capture images of a user performing a gesture with his or her hand (further described in connection with FIG. 4). The images of the user may then be processed by a gesture recognition engine. The processing of the user gesture input includes extraction of features at 302 and comparing features with expected gesture inputs at 303. This allows the gesture recognition to determine a confidence level for the capture user gesture input at 304, e.g., a score relating how closely the user's actual input matches a predetermined, expected input.

The confidence level may be built upon a number of factors used in gesture recognition. Each factor (n) will have confidence level ($C_n$), which describes how close to an expected value input provided by the user is, as well as a weight ($W_n$), which is a representation of the importance of that factor.

An example of a factor used by a gesture recognition engine includes, but is not limited to, the shape of the gesture (which may be static or dynamic/include motion). The shape of the gesture for example may include the shape of object, e.g., human body/hand/finger used to perform the gesture, the motion, speed and range of the motion of the object performing the gesture, the distance between the gesture input component (e.g., camera) and the object performing the gesture, e.g., user's hand, etc. For example, when a user is in the range of required distance, this results in a high confidence level for this factor, whereas when user is out of the range, then the result will be a low confidence level.

Lighting may be included as a factor used by a gesture recognition engine, e.g., with appropriate/high lighting resulting in higher confidence levels and lower/dim lighting resulting in lower confidence levels. The lighting impacts the gesture recognition engine's ability to distinguish and extract various features of the gesture input.

The existence of distractions (e.g., additional people or moving objects in a captured image) may likewise impact the confidence calculation and be used as a factor by a gesture recognition engine. For example, the existence of a distraction such as a moving object captured in an input image will introduce a negative weight to the overall gesture confidence level that is calculated for the user gesture input.

By way of example, the overall confidence level of a gesture may be calculated as follows:

$$C=(\Sigma_{n=1}^{N} C_n * W_n)/(\Sigma_{n=1}^{N} W_n)$$

where C is the overall confidence level of the gesture, N is the number of the factor, $C_n$ is the confidence level of the $n^{th}$ factor, and $W_n$ is the weight of the $n^{th}$ factor. The overall confidence level of the gesture is the weighted sum of each factor over the sum of the weight. C is in the range of [0, 1], in which 1 is the highest confidence, 0 is the lowest confidence.

As described herein, an embodiment defines at least two threshold values, e.g., a higher and a lower threshold value, against which the confidence level for a particular received user gesture input may be evaluated. In an embodiment, two thresholds are defined as $C_{fuzzy}$ and $C_{action}$, with the fuzzy threshold being a lower threshold and the action threshold being a higher threshold.

An embodiment employs the thresholds to determine a grey or fuzzy area where, although some gesture input has been recognized, the gesture recognition engine has not recognized the particular gesture with a high degree of confidence for some reason(s). Thus, rather than performing no action, an embodiment may provide additional functionality such that the gesture input may be utilized even if not recognized with a high degree of confidence.

For example, referring again to FIG. 3, at 305 if the overall confidence level calculated for the gesture input is determined not to exceed even the lower threshold, $C_{fuzzy}$ then an embodiment may take no action at 306. If the overall confidence level is higher than $C_{fuzzy}$ as determined at 305, but does not exceed the higher threshold, $C_{action}$, as determined at 307, then the alternative predetermined action(s) described herein will be performed at 309. If the overall confidence level of the gesture is higher than $C_{action}$, as determined at 307, then the gesture is recognized and the corresponding outcome is carried out at 308, similar to a conventional gesture recognition system.

There may be a number of factors that contributed to the confidence level and to the determining of the appropriate levels for the thresholds utilized. For example, the uniqueness of the gesture may be taken into account, where the likelihood that the gesture is similar to non-gesture inputs is factored in, e.g., requiring a higher degree of confidence prior to recognition. The cost of performing the gesture may be taken into account, e.g., requiring a higher degree or level of confidence for gestures that commit system actions that are difficult or cumbersome to undo. The time of usage may be taken into account, e.g., over time the lower threshold may increase (and thus require a higher degree of gesture performance fidelity) since the user has gained familiarity with the gesture input system. Of note, the higher and lower thresholds may be independent. Moreover, in addition to modifying or changing the thresholds over time, more than two thresholds may be employed.

As will be appreciated, an embodiment addresses usability issues of conventional gesture systems. For example, using a conventional system, if a user performs a finger gesture and his or her finger is not as strictly straight as required, then this finger gesture won't be recognized. Similarly, if a user performs a gesture motion correctly but in a wrong context (e.g., the current application does not support that gesture input, etc.), then a conventional gesture system won't give the user any feedback even if user repeats the same motion again and again, since the gesture is not recognized.

An embodiment uses the multiple thresholds to provide a more interactive gesture recognition system. By "interactive" it is meant that the gesture recognition system intelligently fits the user's needs. For example, when a camera gesture system reaches a certain confidence level that user is trying to perform a gesture (but it is not necessarily known which gesture), an embodiment may adjust to user's needs, e.g., personalize itself to the individual user's characteristics and/or interact with the user to provide intelligent tips based on the information that the system has already collected, to prompt the user for further gesture input or other input, etc.

Some example cases are described and illustrated herein. For example, if part of a user gesture input is out of the field of view of the camera or the distance between the camera and the user/object performing the gesture is too great, an embodiment may adjust the field of view of the camera automatically and/or ask the user to reposition himself or herself. As another example, if the lighting is not adequate, an embodiment may adjust the camera settings or provide active lighting to the environment. Likewise, if the movement speed of the user performing the gesture is too slow/fast, an embodiment may provide a tip, e.g., a verbal and/or visual indication instructing how to properly perform the gesture. Similarly, if a correctly performed gesture is performed in an incorrect context (e.g., gesture not supported by the currently running application), an embodiment may notify the user of this fact. Likewise, if the shape of human part or object is not correct or improperly oriented, an embodiment may provide a corrective tip or instruction for the user.

Thus, as described herein, an embodiment provides a gesture recognition system that gives users suggestions/tips on how to adjust and/or automatically adjusts the system or components thereof, e.g., camera settings, to help recognize ambiguous gestures. Moreover, an embodiment may make a best guess or estimate using the user's gesture input and, e.g., ask the user to confirm the guess or estimate.

Figure 4:
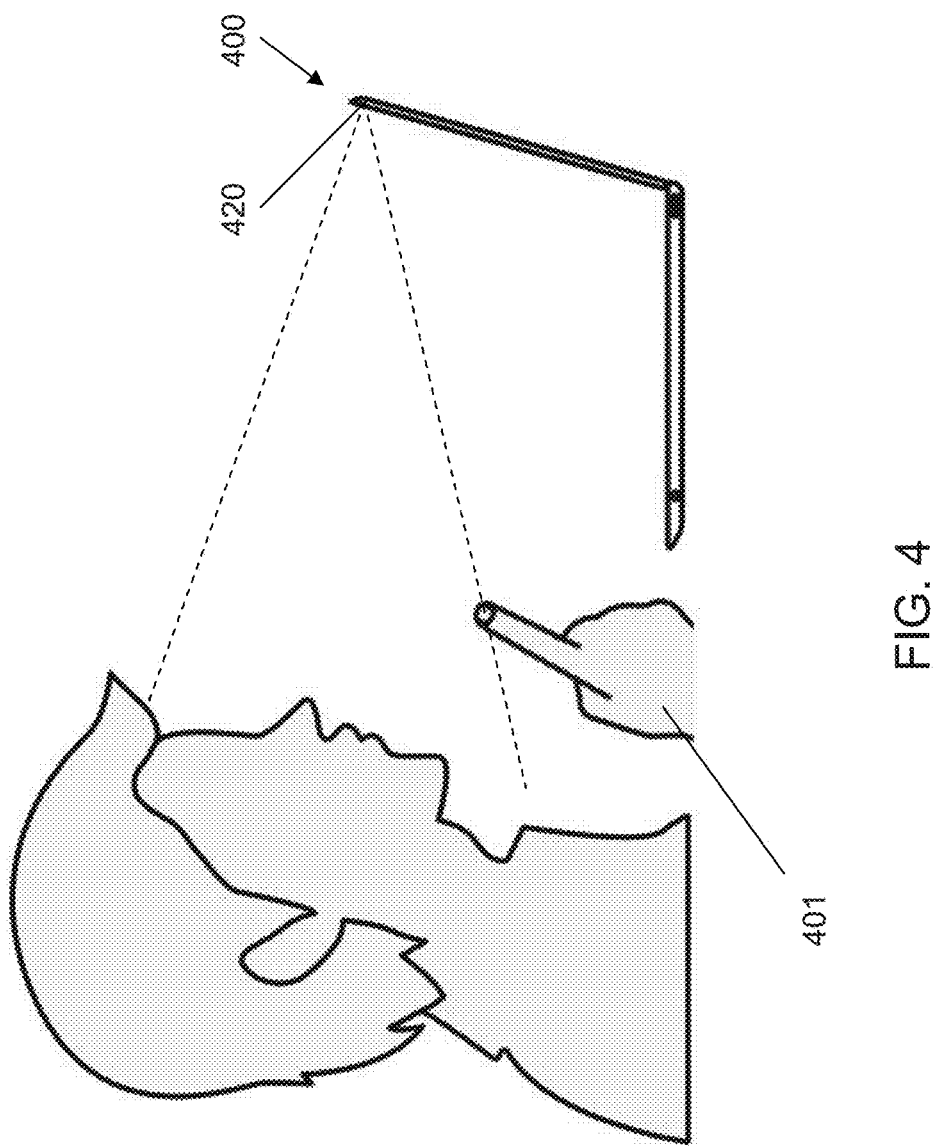
FIG. 4 illustrates an example of using multiple thresholds for interactive user gestures input

Referring to FIG. 4, a user may want to mute the volume on a video being played in a device 400. He or she tries to use a "mute" gesture, e.g., lifting a finger 401 up to the lips, but his or her hand is too low and too far from the face for it to be recognized by the gesture input component, e.g., camera 420. Conventionally this would result in no gesture being recognized and no action being taken.

Figure 5:
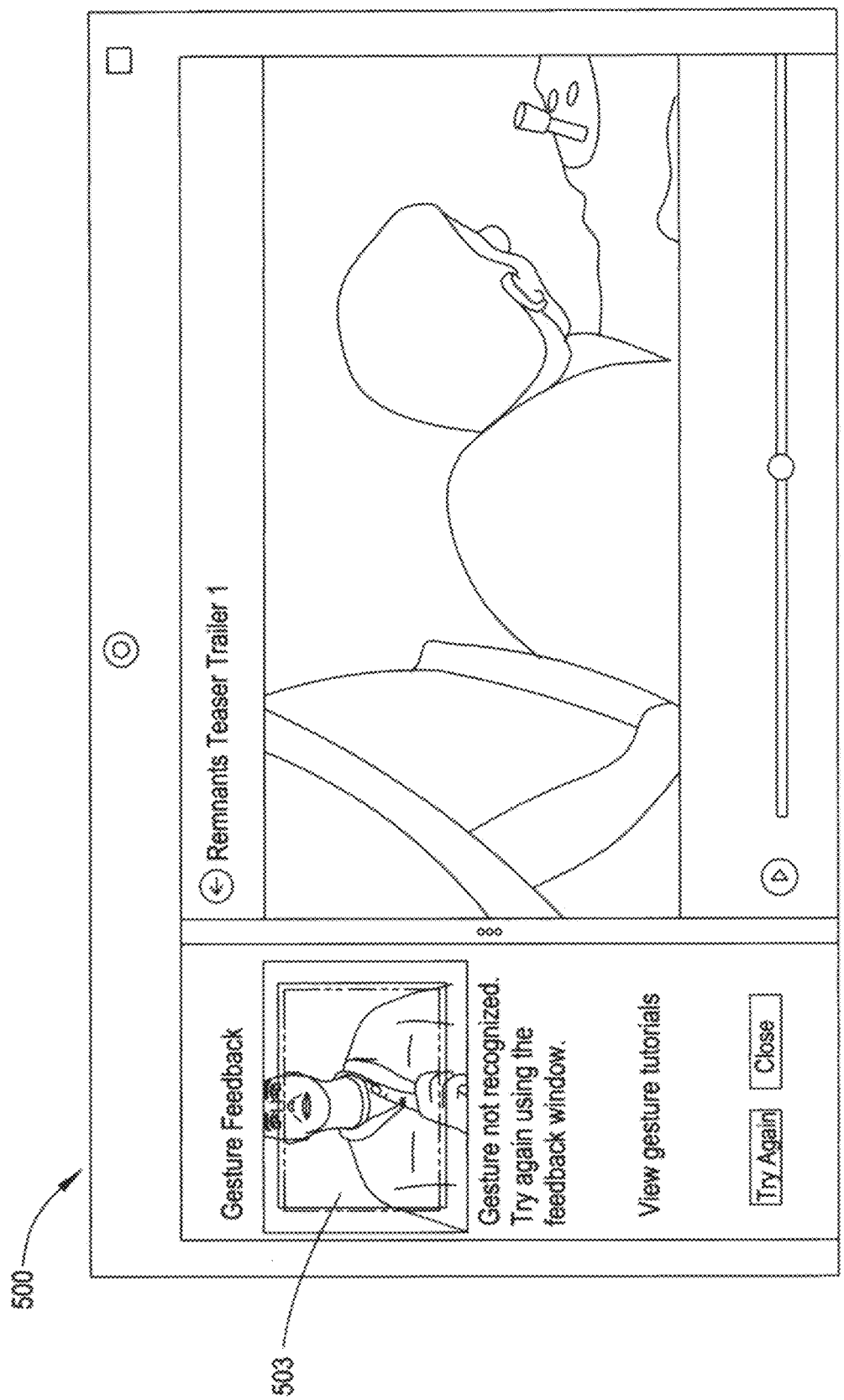
FIG. 5 illustrates an example of providing instructive feedback to a user attempting to perform a user gesture input.

However, according to an embodiment and referring to FIG. 5, instructive feedback may be given on the basis that although the gesture input of FIG. 4 does not exceed a higher level threshold for taking a specific gesture based action, it may exceed the fuzzy threshold such that a best guess of a mute gesture attempt is ascertained by the system. Thus, an embodiment may provide instructive feedback 503, e.g., in the form of an image or video in a display screen of the device 500 such that the user may be instructed how to properly perform the gesture. Here, the feedback 503 may indicate that the gesture is not recognized because the field of view does not include enough of the user's hand 401 and instruct the user regarding the same.

Figure 6:
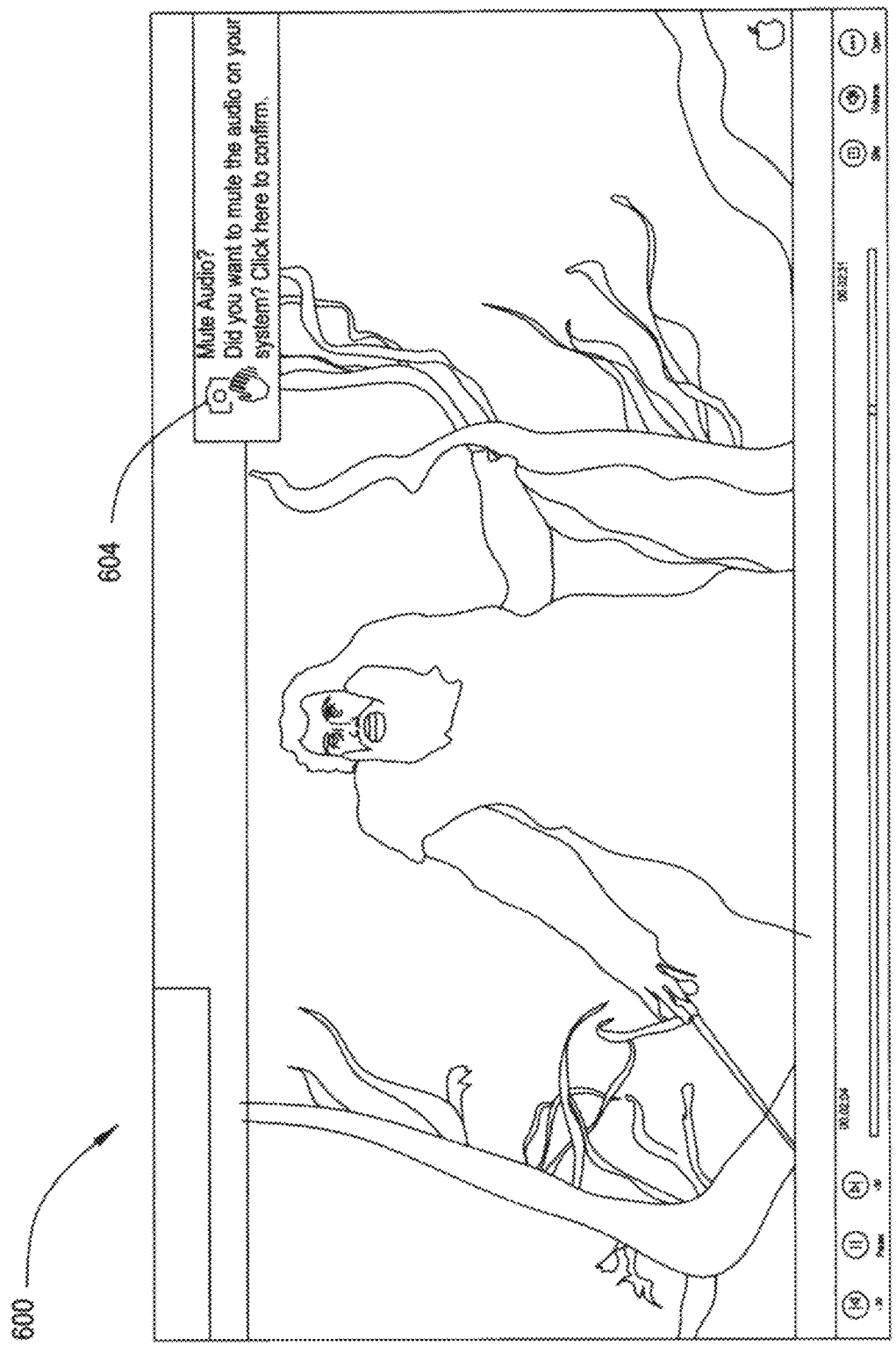
FIG. 6 illustrates an example of communicating with a user to confirm a predetermined action based on a confidence level.
Figure 7:
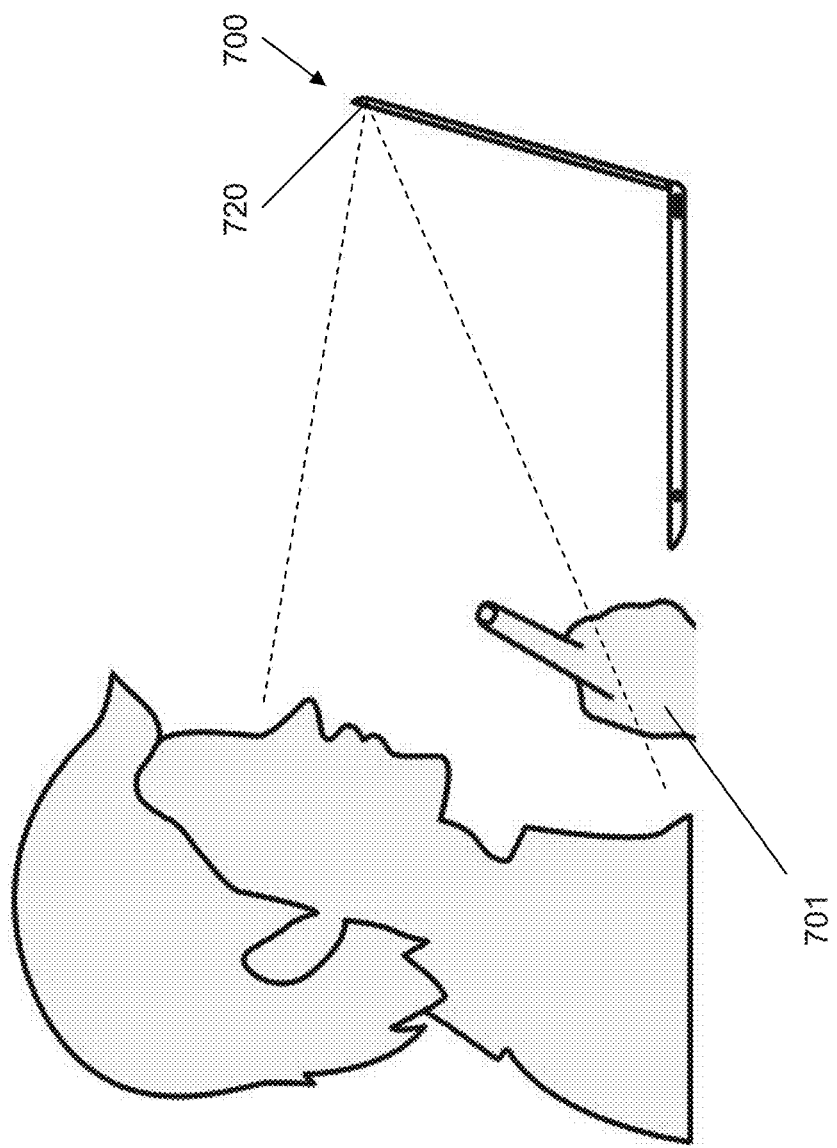
FIG. 7 illustrates an example of adjusting a gesture input component.

Likewise, referring to FIG. 6, an embodiment may provide a message 604 in a display window of a device 600 asking the user to confirm a best guess for the attempted user gesture input. For example, an embodiment may guess that the user is attempting the mute audio gesture on the basis of the user exceeding the lower confidence threshold but not the higher confidence threshold and ask the user to confirm the same using message 604.

Given such instructive feedback, e.g., as illustrated in FIG. 5, a user may re-perform the gesture using a proper technique. However, an embodiment may adapt and adjust to a particular user, e.g., one that, although he or she knows they should lift their hand higher cannot do so for some reason (e.g., discomfort, injury, etc.). Thus, an embodiment may adjust the gesture input component, e.g., re-directing the field of view of the camera 720 such that it is able to capture the user's finger 701 to extract that feature of the gesture input. Therefore, the device 700 will make adjustments to accommodate the user's particular needs in performing gestures proactively such that the user may technically mis-perform certain gestures yet still utilize the full functionality of the system.

It will be appreciated then that the various embodiment provide a more interactive and flexible gesture recognition system. According to the example embodiments described herein, a user is able to interact with the gesture recognition system in order to learn more about how to use the system and the system itself may adapt to accommodate the personal needs of various users.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
capturing, using a gesture input component of an information handling device, a user gesture input within a field of view of the gesture input component;
comparing, using a processor, the user gesture input to a database comprising a plurality of predetermined gesture inputs;
identifying, using the processor, a lower similarity threshold associated with one of the plurality of predetermined gesture inputs and a higher similarity threshold associated with the one of the plurality of predetermined gesture input;
determining, based on the comparing, whether a confidence level calculated based on the comparing exceeds the lower similarity threshold or the higher similarity threshold, wherein the confidence level required to exceed the lower similarity threshold is dictated by a likelihood that the user gesture input is similar to a non-gesture input and wherein the confidence level required to exceed the higher similarity threshold is dictated by a performance cost of a system of the information handling device to undo an action resulting from user gesture input;
providing, responsive to determining that the confidence level exceeds the lower similarity threshold but not the higher similarity threshold, a tutorial comprising a modification suggestion for an aspect of the user gesture input to produce an intended predetermined gesture input; and
executing, responsive to determining that the confidence level exceeds the higher similarity threshold, a function corresponding to the user gesture input.

2. The method of claim 1, wherein the comparing comprises comparing one or more extracted features of the user gesture input, wherein the one or more extracted features of the user gesture input are selected from the group consisting of shape of an object forming a user gesture; distance between an object forming the user gesture and the gesture input component; lighting condition of the captured user gesture input; and distractions included in the captured user gesture input.

3. The method of claim 1, further comprising
automatically performing a predetermined action associated with the user gesture input if the user gesture input achieves the predetermined level of similarity with the predetermined gesture input.

4. The method of claim 1, further comprising actively soliciting further user input responsive to the determining.

5. The method of claim 4, wherein the actively soliciting comprises prompting a user to confirm a predetermined action.

6. The method of claim 1, further comprising providing suggestive feedback to the user on how to properly perform the predetermined gesture input.

7. The method of claim 6, wherein the suggestive feedback comprises information associated with one or more extracted features of previously captured gesture inputs that did not obtain the predetermined level of similarity with the predetermined gesture input.

8. An information handling device, comprising:
a gesture input component;
a processor operatively coupled to the gesture input component;
a memory device that stores instructions accessible to the processor, the instructions being executable by the processor to:
capture, using the gesture input component of an information handling device, a user gesture input within a field of view of the gesture input component;
compare the user gesture input to a database comprising a plurality of predetermined gesture inputs;
identify a lower similarity threshold associated with one of the plurality of predetermined gesture inputs and a higher similarity threshold associated with the one of the plurality of predetermined gesture input;
determine, based on the comparing, whether a confidence level calculated based on the comparing exceeds the lower similarity threshold or the higher similarity threshold wherein the confidence level required to exceed the lower similarity threshold is dictated by a likelihood that the user gesture input is similar to a non-gesture input and wherein the confidence level required to exceed the higher similarity threshold is dictated by a performance cost of a system of the information handling device to undo an action resulting from user gesture input;
provide, responsive to determining that the confidence level exceeds the lower similarity threshold but not the higher similarity threshold, a tutorial comprising a modification suggestion for an aspect of the user gesture input to produce an intended predetermined gesture input; and
execute responsive to determining that the confidence level exceeds the higher similarity threshold, a function corresponding to the user gesture input.

9. The information handling device of claim 8, wherein the instructions executable by the processor to compare comprise instructions executable by the processor to compare one or more extracted features of the user gesture input, wherein the one or more extracted features of the user gesture input are selected from the group consisting of shape of an object forming a user gesture; distance between an object forming the user gesture and the gesture input component; lighting condition of the captured user gesture input; and distractions included in the captured user gesture input.

10. The information handling device of claim 8, wherein the instructions are further executable by the processor to automatically perform a predetermined action associated with the user gesture input if the user gesture input achieves the predetermined level of similarity with the predetermined gesture input.

11. The information handling device of claim 8, wherein the instructions are further executable by the processor to actively solicit further user input responsive to the determining.

12. The information handling device of claim 11, wherein the instructions executable by the processor to actively solicit comprise instructions executable by the processor to prompta user to confirm a predetermined action.

13. The information handling device of claim 8, wherein the instructions are further executable by the processor to provide suggestive feedback to the user on how to properly perform the predetermined gesture input.

14. The information handling device of claim 13, wherein the suggestive feedback comprises information associated with one or more extracted features of previously captured gesture inputs that did not obtain the predetermined level of similarity with the predetermined gesture input.

15. A product, comprising:
a storage device having processor executable code stored therewith, the code comprising:

code that captures, using a gesture input component of an information handling device, a user gesture input within a field of view of the gesture input component;

code that compares, using a processor, the user gesture input to a database comprising a plurality of predetermined gesture inputs;

code that identifies, using the processor, a lower similarity threshold associated with one of the plurality of predetermined gesture inputs and a higher similarity threshold associated with the one of the plurality of predetermined gesture input;

code that determines, based on the comparing, whether a confidence level calculated based on the comparing exceeds the lower similarity threshold or the higher similarity threshold , wherein the confidence level required to exceed the lower similarity threshold is dictated by a likelihood that the user gesture input is similar to a non-gesture input and wherein the confidence level required to exceed the higher similarity threshold is dictated by a performance cost of a system of the information handling device to undo an action resulting from user gesture input; and code that provides, responsive to determining that the confidence level exceed the lower similarity threshold but not the higher similarity threshold, a tutorial comprising a modification suggestion for an aspect of the user gesture input to produce an intended predetermined gesture input; and code that executes, responsive to determining that the confidence level exceeds the higher similarity threshold, a function corresponding to the user gesture input.

\* \* \* \* \*